United States Patent [19]

Coombs et al.

[11] Patent Number: 4,705,768

[45] Date of Patent: Nov. 10, 1987

[54] COPRECIPITATE OF METAL PHOSPHATES

[75] Inventors: Daniel M. Coombs, Borger, Tex.; Ted H. Cymbaluk, Bartlesville, Okla.; Brent J. Bertus, Bartlesville, Okla.; Simon G. Kukes, Bartlesville, Okla.

[73] Assignee: Phillips Petroleum Company, Bartlesville, Okla.

[21] Appl. No.: 4,514

[22] Filed: Jan. 20, 1987

Related U.S. Application Data

[62] Division of Ser. No. 859,980, May 5, 1986, Pat. No. 4,680,105.

[51] Int. Cl.$^4$ .................. B01J 27/198; B01J 27/19; B01J 27/185; B01J 27/18
[52] U.S. Cl. .................................. 502/213; 502/208; 502/209; 502/210; 502/211; 502/214
[58] Field of Search ............... 502/213, 208, 209–211, 502/214

[56] References Cited

U.S. PATENT DOCUMENTS

| | | | |
|---|---|---|---|
| 3,159,564 | 12/1964 | Kelley et al. | 208/59 |
| 3,278,421 | 10/1966 | Gatsis | 208/264 |
| 3,308,054 | 3/1967 | Duir et al. | 208/89 |
| 3,493,517 | 2/1970 | Jaffe | 252/437 |
| 3,507,784 | 4/1970 | O'Hara | 208/216 |
| 3,546,105 | 12/1970 | Jaffe | 208/216 |
| 3,577,353 | 5/1971 | White | 252/465 |
| 3,627,672 | 12/1971 | Kittrell et al. | 208/143 |
| 3,684,688 | 8/1972 | Roselius | 208/50 |
| 3,791,967 | 2/1974 | Jaffe | 208/216 |
| 3,830,731 | 8/1974 | Reed et al. | 208/211 |
| 3,846,284 | 11/1974 | Jaffe | 208/216 |
| 3,891,538 | 6/1975 | Walkey | 208/50 |
| 4,169,040 | 9/1979 | Bea et al. | 208/59 |
| 4,291,184 | 9/1981 | Crum et al. | 585/443 |
| 4,384,985 | 5/1983 | Crum et al. | 502/213 |
| 4,444,655 | 4/1984 | Shiroto et al. | 208/210 |
| 4,450,068 | 5/1984 | Kukes | 208/251 H |
| 4,555,499 | 11/1985 | Kukes et al. | 502/208 |
| 4,557,824 | 12/1985 | Kukes et al. | 208/251 H |

OTHER PUBLICATIONS

Periodic Table of Elements.

*Primary Examiner*—P. E. Konopka
*Attorney, Agent, or Firm*—K. K. Brandes

[57] ABSTRACT

A new composition of matter comprises nickel phosphate and titanium phosphate, prepared by coprecipitation. A process for removing metals from a hydrocarbon-containing feed stream, in particular a heavy oil, comprises hydrotreatment in the presence of a solid catalyst composition comprising coprecipitated nickel phosphate and titanium phosphate.

26 Claims, No Drawings

COPRECIPITATE OF METAL PHOSPHATES

This application is a division of copending application Ser. No. 859,980, filed May 5, 1986, now U.S. Pat. No. 4,680,105.

BACKGROUND OF THE INVENTION

In one aspect, this invention relates to a process for removing metals from a substantially liquid hydrocarbon-containing feed stream, which also contains metal compounds as impurities. In another aspect, this invention relates to a new, efficient metal phosphate catalyst composition that is used in a hydrotreating process for removing metals from a substantially liquid hydrocarbon-containing feed steam.

It is well known that crude oil, heavy petroleum products, products from extraction and/or liquifaction of coal and lignite, products from tar sands, products from shale oil and similar products may contain metals such as vanadium, nickel, iron and arsenic. When these hydrocarbon-containing feeds are fractionated, the metals tends to concentrate in the heavier fractions such as the topped crude and residuum. The presence of these metals makes further processing of these heavier fractions difficult since the metals generally act as poisons for catalysts employed in downstream processes such as catalytic cracking, hydrogenation, hydrodesulfurization or hydrodenitrogenation. There are known processes for removing these metals from hydrocarbon-containing feeds. However, there is an ever present need to develop new, efficient hydrofining processes and catalyst compositions used therein.

SUMMARY OF THE INVENTION

It is thus an object of this invention to provide a process for removing metals from a substantially liquid hydrocarbon-containing feed stream so as to improve the processability of such a hydrocarboncontaining feed stream and especially improve the processability of heavier fractions such as topped crude and residuum. It is also an object of this invention to employ a mixed metal phosphate as catalyst composition for the demetallization of hydrocarbon-containing feed streams. It is a further object to provide a mixed metal phosphatecontaining composition of matter. Other objects and advantages will become apparent from the detailed description and the appended claims.

In accordance with this invention, a substantially liquid hydrocarbon-containing feed stream, which also contains metals, is contacted with a free hydrogen containing gas in the presence of a solid catalyst composition comprising nickel phosphate and titanium phosphate, under such conditions as to obtain a hydrocarbon-containing liquid product stream having a reduced concentration of metals (i.e., containing a smaller amount of metals per volume than the feed stream). It is believed that the metals contained in the feed stream are chemically bound, e.g. to heterocyclic compounds such as porphyrins. It is also believed that the metals are removed from the heterocyclic compounds by the combination of heat, hydrogen and the catalyst composition of the hydrotreating process (also referred to as hydrodemetallization process) of this invention and are trapped in pores of the catalyst composition. Removal of the metals from the hydrocarbon containing feed stream in this manner provides for improved processability of the hydrocarbon-containing feed stream in processes such a catalytic cracking, hydrogenation, hydrodesulfurization and hydrodenitrogenation.

Also in accordance with this invention, a composition of matter comprising (preferably consisting essentially of) nickel phosphate and titanium phosphate in admixture is provided. In a preferred embodiment, the composition of matter of this invention comprises mixed orthophosphates of Ni and Ti. Preferably, this composition of matter is formed by coprecipitation of nickel(II) orthophosphate and titanium(IV) orthophosphate. The composition of matter of this invention is used as catalyst composition in the hydrotreating process of this invention.

DETAILED DESCRIPTION OF THE INVENTION

Any metal which can be trapped in the pores of the catalyst composition of the present invention can be removed from a hydrocarbon-containing feed stream in accordance with the hydrotreating process of this invention. The hydrotreating process of this invention is particularly applicable to the removal of vanadium and nickel.

Metals can be removed from any suitable hydrocarbon-containing feed streams. Suitable hydrocarbon-constaining feed streams include petroleum, petroleum products, coal pyrolyzates, products from extraction and/or liquifaction of coal and lignite, products from tar sands, shale oil, products from shale oil and similar products. Suitable hydrocarbon-containing feed streams include full-range heavy crude oils, topped crudes having a boiling range in excess of about 400° F., and residua. However, the present invention is particularly directed to heavy feed streams such as heavy topped crudes and residua and other materials which are generally regarded as being too heavy to be distilled. These materials will generally contain the highest concentrations of metals such as vanadium and nickel, generally about 5–500 ppmv (parts by weight per million parts by weight of feed) of Ni and 10–1,000 ppmw of V. In addition, these feed streams generally also contain sulfur compounds (generally about 0.5–8 weight-% S), nitrogen compounds (generally about 0.2–3 weight-% N), and coke precursors (generally about 0.1–30 weight-% Ramsbottom carbon residue; determined according to ASTM D524). The API$_{60}$ gravity of these feed streams generally is in the range of from about 4 to about 30. The term "substantially liquid feed stream" as used herein means that the feed stream is substantially liquid at the contacting conditions of the process of this invention.

The composition of matter of this invention, which is used as the demetallization catalyst in the hydrotreating process of this invention is a novel composition of matter comprising nickel phosphate and titanium phosphate. As used herein, the term phosphate includes orthophosphates, pyrophosphates, metaphosphates and polyphosphates. The presently preferred composition of matter comprises (more preferably consists essentially of) the mixed orthophosphates of divalent nickel and of tetravalent titanium.

The composition of matter of this invention, which is employed as a catalyst composition in the hydrotreating process of this invention, can be prepared by any suitable method. Coprecipitation is preferred because the catalyst composition is believed to be more effective when prepared by coprecipitation, whereby a solution containing any suitable nickel compound and any suitable titanium compound is mixed with any suitable phosphate (preferably dissolved). The coprecipitation may be carried out in any suitable solvent such as water or alcohol, with water being the preferred solvent. The metal compounds and the added phosphate must be soluble in the solvent used to be suitable.

If a phosphate such as diammonium phosphate is utilized, the pH of the solution will generally be such that precipitation will occur. However, if other phosphates are used, it may be necessary to add a base such as ammonia to achieve a pH which will result in the desired precipitation.

The precipitate formed is separated from the solution (preferably aqueous) from which it is formed, washed, dried and calcined in the presence of a free oxygen containing gas such as air or in an inert gas atmosphere such as nitrogen to form the catalyst composition. Presently preferred is air as the calcining atmosphere.

The drying of the precipitate can be accomplished at any suitable temperature. Generally a temperature of about 20° C. to about 200° C., preferably about 80° C. to about 150° C., is utilized for a time in the range of about 0.5 hour to about 30 hours, preferably from about 1 hour to 10 hours.

The calcining step is utilized to remove traces of anions such as nitrates, traces of carbon and water and to make the structure of the catalyst composition harder. Any suitable calcining temperature can be utilized. Generally the calcining temperature will be in the range of about 300° C. to about 800° C., with a temperature in the range of about 400° C. to about 650° C. being preferred, for a time in the range of from about 0.5 hour to about 24 hours, preferably from about 1 hour to about 6 hours.

The composition of matter (catalyst composition) of this invention can have any suitable surface area and pore volume. In general, the surface area (determined by $BET/N_2$; ASTM D3037) will be in the range of from about 5 to about 500 $m^2/g$, preferably from about 20 to about 250 $m^2/g$, while the pore volume (measured by mercury intrusion using an Autopore 9200 instrument of Micromeretics, Norcross, Ga.) will be in range of from about 0.2 to about 4.0 cc/g, preferably from about 0.4 to about 2.0 cc/g.

Any suitable phosphates can be utilized to prepare the catalyst composition of matter of this invention. Suitable phosphates include $(NH_4)H_2PO_4$, $(NH_4)_2HPO_4$, $(NH_4)_3PO_4$, $(NH_4)_4P_2O_7$, corresponding phosphates and pyrophosphates of lithium, sodium, potassium, cesium, $H_3PO_4$ and $H_3PO_3$. Phosphonic acids such as phenyl phosphonic acids and the metal and ammonium salts of phosphonic acids may also be used to derive phosphates for the catalyst composition if desired. Presently preferred is $(NH_4)_2HPO_4$.

Suitable metal compounds that can be utilized to prepare the catalyst composition of matter of this invention include $NiCl_2$, $NiBr_2$, $Ni(NO_3)_2$, $Ni(HSO_4)_2$, $NiSO_4$, nickel(II) acetate or other nickel(II) carboxylates and the like; $TiCl_4$, $TiOCl_2$, $TiO(NO_3)_2$, $TiOSO_4$, Ti(IV) carboxylates, $Ti(OR)_4$ wherein R is an alkyl group having 1-6 C atoms per molecule, and the like. Presently prefered metal compounds are $Ni(NO_3)_2 \cdot 6H_2O$ and Ti(IV) n-butoxide.

Optionally (yet presently not preferred), the above-described coprecipitation of Ni-Ti phosphate can be carried out from an aqueous solution containing at least one finely dispersed inorganic refractory material therein, thus producing a mixture of nickel phosphate, titanium phosphate and such an inorganic refractory material. Non-limiting examples of such inorganic refractory materials are alumina, silica, metal silicates, aluminosilicates (e.g., zeolites), titania, zirconia, magnesia, and mixtures thereof; preferably alumina. When such a refractory material is present, the amount of this material in the entire mixture generally is in the range of about 1 to about 90 weight-%, preferably in the range of about 1 to about 50 weight-%.

It is also within the scope of this invention, even though presently not preferred, to carry out of the above-described coprecipitation in the presence of dissolved compounds of Co, Fe, Cr, Mo, V, Cu and Zr and to thus form mixed nickel-titanium-cobalt phosphate, nickel-titanium-iron phosphate, nickel-titanium-chromium phosphate, nickel-titanium-molybdenum phosphate, nickel-titanium-vanadium phosphate, nickel-titanium-copper phosphate, nickel-titanium-zirconium phosphate, nickel-titanium-cobalt-zirconium phosphate, nickel-titanium-cobalt-iron phosphate, nickel-titanium-cobalt-vanadium phosphate and the like. When phosphates of Co, Fe, Cr, Mo, V, Cu and Zr are incorporated into the composition of matter of this invention (as outlined above), the weight of these phosphates will generally be less than the combined weight of nickel phosphate and titanium phosphate and will preferably be present in the range of from about 1 weight-% to about 30 weight-% of the entire mixed phosphate composition.

Any suitable ratio of nickel and titanium to phosphorus in the catalyst composition can be used. The weight ratio of the sum of metals (Ni+Ti) to phosphorus will generally be in the range of about 1:1 to about 4:1, preferably in the range of from about 1:1 to about 3:1. Any suitable ratio of nickel to titanium can be used. The atomic ratio of nickel to titanium will generally be in the range of from about 1:5 to about 5:1, preferably in the range of from about 1:2 to about 2:1.

The hydrodemetallization process of this invention can be carried out means of any apparatus whereby there is achieved a simultaneous contact of the catalyst composition of this invention with the hydrocarbon-containing feed stream and a free hydrogen containing gas under suitable demetallization conditions. The process can be carried out as a batch or continuous process. The process is in no way limited to the use of a particular apparatus. The process of this invention can be carried out using a fixed catalyst bed, a fluidized catalyst bed, a moving catalyst bed or a slurry of the catalyst in the feed. Presently preferred is a fixed catalyst bed employed in a continuous operation.

The catalyst composition can be used alone in the reactor or can be used in combination with substantially unpromoted refractory materials such as alumina, silica, titania, magnesia, metal silicates, metal aluminates, aluminosilicates, metal titanates, metal phosphates (such as aluminum phosphate) and the like, and mixtures thereof. A layer of the unpromoted material and a layer of the catalyst composition may be used, or the catalyst composition can be mixed with the unpromoted material. Use of the unpromoted refractory material provides for better dispersion of the hydrocarbon containing feed stream. Also other catalysts such as known hydrogenation and desulfurization catalysts (such as $Co/Mo/Al_2O_3$ and $Ni/Mo/Al_2O_3$) may be used in the reactor to achieve simultaneous demetallization, desulfurization and hydrogenation or hydrocracking if desired. However, the presence of such hydrogenation and desulfurization catalysts in the process of this invention is presently not preferred.

Any suitable reaction time (contact time) between the catalyst composition, hydrogen containing gas and the hydrocarbon-containing feed stream can be utilized. In general, the contact time will range from about 0.1 hours to about 10 hours. Preferably, the reaction time will range from about 0.4 to about 4 hours. Thus the flow rate of the hydrocarbon-containing feed stream in a continuous operation should be such that the time required for the passage of the mixture through the reactor (residence time) will be in the range of from about 0.1 to about 10 hours, and preferably be in the range of from about 0.4 to about 4 hours. This generally requires a liquid hourly space velocity (LHSV) in the range of about 0.10 to about 10 cc of oil feed per cc of catalyst per hour, preferably from about 0.2 to about 2.5 cc/cc/hr.

The hydrodemetallization process of the present invention can be carried out at any suitable temperature. The process temperature will generally be in the range of about 250° C. to about 550° C. and will preferably be in the range of about 350° C. to about 450° C. Higher temperatures do improve the removal of metals but will generally not be utilized if they have adverse effects on the hydrocarbon-containing feed stream, such as excessive coking. Also economic considerations must be taken into account. Lower temperatures can generally be used for light feeds.

Any suitable pressure can be utilized in the demetallization process of this invention. The reaction pressure will generally be in the range of about atmospheric (0 psig) to about 5,000 psig. Preferably, the pressure will be in the range of from about 100 to about 2500 psig. Higher pressures tend to reduce coke formation but operation at high pressure may have adverse economic consequences.

Any suitable quantity of hydrogen gas can be added to the demetallization process. The quantity of hydrogen used to contact the hydrocarbon containing feed stock will generally be in the range of about 100 to about 10,000 standard cubic feet (SCF) hydrogen per barrel of the hydrocarbon-containing feed stream and will more preferably be in the range of about 1,000 to about 6,000 standard cubic feet per barrel of the hydrocarbon-containing feed stream. Hydrogen can be employed as essentially pure hydrogen gas (presently preferred) or as a mixture with other gases such as CO, $CO_2$, $N_2$, He or other inert gases, low paraffins such as methane and the like.

In general, the catalyst composition is utilized for demetallization until a satisfactory level of metals (preferably Ni and V) removal fails to be achieved which is believed to result from the coating of the catalyst composition with coke and the metals being removed. It is possible to remove the metals from the catalyst composition by certain leaching procedures but these procedures are expensive, and it is generally contemplated that once the removal of metals falls below a desired level, the used catalyst will simply be replaced by a fresh catalyst.

The time in which the catalyst composition will maintain its activity for removal of metals will depend upon the metals concentration in the hydrocarbon containing feed streams being treated. It is believed that the catalyst composition may be used for a period of time long enough to accumulate 20–200 weight-% of metals, mostly Ni and V, based on the weight of the catalyst composition, from oils.

The life of the catalyst composition and the efficiency of the demetallization process are belived to be improved by introducing a decomposable metal compound into the hydrocarbon containing feed stream. The metal in the decomposable metal compound can be selected from the group consisting of transition metals of Group IB, Group IIB, Group IIIB, Group IVB, Group V-B, Group VI-B, Group VII-B and Group VIII, of the Periodic Table (as defined in "College Chemistry" by W. H. Nebergall et al, Fourth Edition, 1972, D.C. Heath and Co.). Preferred metals are molybdenum, tungsten, manganese, zirconium and the like. Molybdenum is a particularly preferred metal which may be introduced as carbonyl, actetate, acetylacetonate, carboxylate (preferably octanoate, naphthenate), mercaptide, dithiophosphate, dithiocarbamate, or mixtures thereof. Presently more preferred are $Mo(CO)_6$, molybdenum dithiophosphate and molybdenum dithiocarbamate.

Any suitable concentration of the additive may be added to the hydrocarbon-containing feed stream. In general, a sufficient quantity of the additive will be added to the hydrocarbon containing feed stream to result in a concentration of the metal (preferably Mo) in the feed in the range of from about 1 to about 1000 parts per million and more preferably in the range of about 5 to about 200 parts per million (i.e., parts per weight of Mo per million parts by weight of hydrocarbon-containing feed).

In general, at least a portion of the hydrotreated product stream obtained in the process of this invention is subsequently hydrotreated, e.g. in the presence of supported nickel, cobalt and molybdenum catalysts (e.g., $CoO/Al_2O_3$; $NiO/Al_2O_3$) for further reduction of sulfur and nitrogen. The thus hydrodesulfurized and hydrodenitrogenated material generally undergoes fractional distillation, and a suitable fraction is then cracked in a cracking reactor, such as a fluidized catalytic unit using a zeolite-containing catalyst, under such conditions as to produce lower boiling hydrocarbon materials suitable as gasoline and diesel fuels, heating oils, lubricating oils and similar useful products. It is also possible to catalytically crack the hydrotreated product stream (or a portion thereof) obtained by the hydrotreating process of this invention without another, subsequent hydrotreating process using supported Ni, Co and Mo catalysts.

The following examples are presented in further illustration of the invention and are not be considered as unduly limiting the scope of this invention.

EXAMPLE I

This example illustrates the preparation of various metal phosphates, which were employed as catalysts in hydrofining tests.

Invention Catalyst A was coprecipitated Ni-Ti phosphate which was prepared as follows. 229.8 grams (0.79 mole) of $Ni(NO_3)_2.6H_2O$ were dissolved in about 300 cc of distilled water. A second solution was prepared by adding 267.6 grams of titanium tetrabutoxide (0.79 mole) to enough water, acidified with $H_2SO_4$, so as to obtain a clear solution. The two solutions were mixed and then slowly added to a third aqueous solution containing 308.2 grams (2.33 moles) of $(NH_4)_2HPO_4$ in 300 cc water so as to precipitate Ni-Ti phosphate. The combined mixture containing dispersed Ni-Ti phosphate was mechanically stirred for about 4 hours and filtered through a Buchner funnel. The filter cake was washed three times with water and then three times with isopropanol. The washed filter cake (Ni-Ti phosphate) was dried in air for about 16 hours and then calcined in air at 550° C. for about 3 hours. The calcined Ni-Ti phosphate contained 15 weight-% Ni, 14 weight-% Ti and 22.3 weight-% P. Thus the atomic ratio of Ni:Ti:P was 1.0:1.10:2.77. The nickel-titanium phosphate had a pore volume PV (determined by mercury intrusion at room temperature and a maximum pressure of about 15,000 psig using an Autopore 9200 instrument) was 1.15 cc/g, a BET/$N_2$ surface area SA of 150.9 $m^2$/g, a calculated average pore diameter (4 PV ÷ SA) of about 305 Å, and a bulk density (weight of 1 cc of poured material) of 0.68 g/cc.

Invention Catalyst B was also coprecipiated Ni-Ti phosphate which was prepared as follows. 61 grams (0.18 mole) of titanium tetrabutoxide were added to about 350 cc water acidified with enough nitric acid so as to obtain a clear solution. 52.1 grams of Ni(NO$_3$)$_2$·6-H$_2$O (0.18 moles) were added to about 150 cc H$_2$O so as to prepare a second solution. The two solutions were mixed, and a third solution containing 71.3 grams of (NH$_4$)$_2$HPO$_4$ (0.54) in 250 cc H$_2$O was slowly added to the mixture of the first two solutions so as to precipitate Ni-Ti phosphate at a pH of 4.3. The entire mixture with suspended Ni-Ti phosphate was mechanically stirred for about 16 hours; and then enough aqueous ammonia was added to raise the pH to 8. The entire mixture was filtered through a Buchner funnel and washed and calcined as described for Catalyst A. Catalyst B contained 16 weight-% Ni, 14 weight-% Ti and 22.3 weight-% P, and it had a pore volume of 1.23 cc/g, a surface area of 103 $m^2$/g and a bulk density of 0.55 g/cc.

Control Catalyst C was titanium(IV) phosphate. It was prepared by adding 74 grams (0.26 mole) of titanium tetraisopropoxide to 350 cc H$_2$O containing about 2 cc HNO$_3$. A cloudy solution/suspension was obtained from which some solids settled out. To this solution/suspension was slowly added an aqueous solution of 68.8 grams of (NH$_4$)$_2$HPO$_4$ and enough water to obtain a total mixture of 2 liters. This aqueous mixture was stirred for 2.5 hours and then filtered. The filter cake was washed several times with water and then with isopropanol. The Ti phosphate material was dried for about 2 hours at 90°-95° C. and calcined for 3 hours at 350° C.

Control Catalyst D was Ni-Zr phosphate (U.S. Pat. No. 4,450,068) prepared as follows. 75 grams of ZrOCl$_2$·6H$_2$O were dissolved in about 600 cc of deionized water, with stirring at about 60° C. Then a second solution was prepared by dissolving 100 grams of (NH$_4$)$_2$PO$_4$ in about 400 cc of deionized water. This second solution was added to the first solution. The mixture of the two solutions was stirred for 30 minutes then filtered. The Ni-Zr phosphate filter cake was washed with about 1 liter of deionized water, dried for about 16 hours in an area (about 100° C.) and calcined for 4 hours at 500° C. The thus prepared Ni-Zr phosphate had a pore volume of 1.43 cc/g, a surface area of 231 $m^2$/g, an average calculated pore diameter of about 248 Å and a bulk density of 0.64 g/cc.

EXAMPLE II

This example illustrates the experimental setup for investigating the demetallization of heavy oils by employing various phosphate catalysts. A heavy oil feed was pumped by means of a LAPP Model 211 (General Electric Company) pump to a metallic mixing T-pipe where it was mixed with a controlled amount of hydrogen gas. The oil/hydrogen mixture was pumped downward through a stainless steel trickle bed reactor, 28.5 inches long and 0.75 inches in diameter, fitted inside with a 0.25 inch O.D. axial thermocouple well. The reactor was filled with a top layer (3.5 inches below the oil/H$_2$ feed inlet) of 50 cc of low surface area (less than 1 $m^2$/gram) α-alumina, a middle layer of 50 cc of phosphate catalyst and a bottom layer of 55 cc of α-alumina. The reactor tube was heated by a Thermcraft (Winston-Salem, N.C.) Model 211 3-zone furnace. The reactor temperature was usually measured in four locations along the reactor bed by a travelling thermocouple that was moved within the axial thermocouple well. The liquid product was collected in a receiver, filtered through a glass frit and analyzed. Exiting hydrogen gas was vented. Vanadium and nickel contents in oil were determined by plasma emission analysis.

The heavy oil feed was a 400F+ Maya resid containing 64 ppmw Ni, 331 ppmw V and about 4 weight-%S. All hydrofining (hydrodemetallization) tests were carried out at 760° F., 1400 psig, about 1.0 LHSV (liquid hourly space velocity, i.e., cc oil feed per cc catalyst per hour) and 2,500 standard cubic feet of added H$_2$ per barrel of oil. Test results are summarized in Table I.

TABLE I

| Run | Catalyst | Run Time (Days) | LHSV (cc/cc/Hr) | % Removal of Ni and V Actual | % Removal of Ni and V Corrected[1] | Wt % Coke on Catalyst[2] |
|---|---|---|---|---|---|---|
| 1 (Invention) | A (Ni—Ti—PO$_4$) | 1 | 0.98 | 59.5 | 58.8 | 6.6 |
|  |  | 2 | 1.10 | 55.2 | 58.7 |  |
|  |  | 3 | 1.10 | 52.4 | 55.8 |  |
| 2 (Invention) | B (Ni—Ti—PO$_4$) | 1 | 0.76 | 61.0 | 51.1 | 6.8 |
|  |  | 2 | 0.93 | 57.0 | 54.4 |  |
|  |  | 3 | 0.93 | 55.2 | 52.6 |  |
| 3 (Control) | C (Ti—PO$_4$) | 1 | 1.07 | 19.0 | 20.2 | — |
|  |  | 2 | 0.93 | 21.0 | 19.7 |  |
|  |  | 3 | 0.93 | 24.1 | 22.6 |  |
| 4 (Control) | C (Ti—PO$_4$) | 1 | 1.06 | 23.3 | 24.5 | 11.2 |
|  |  | 2 | 1.07 | 31.4 | 33.2 |  |
|  |  | 3 | 0.96 | 36.0 | 36.9 |  |
| 5 (Control) | D (Ni—Zr—PO$_4$) | 1 | 1.20 | 54.9 | 61.6 | 11.6 |
|  |  | 2 | 1.00 | 53.9 | 53.9 |  |
|  |  | 3 | 0.97 | 51.4 | 48.9 |  |

[1]Corrected for LHSV of 1.0 cc/cc/hour, using first order rate constants
[2]After 3 days; determined by weighing the dried catalyst before and after hydrotreating.

Test results in Table I show that the hydrodemetallization activity (removal of Ni+V) of invention catalysts A and B (Ni-Ti-PO$_4$; runs 1 and 2) was considerably better than that of Ti-PO₄ during the entire run time (runs 3, 4), and also better than that of control Catalyst D (Ni-Zr-PO₄; U.S. Pat. No. 4,450,068) after a run time of 3 days (see run 5; Run Time: 3 days).

Furthermore, test results in Table I clearly show that coke deposition on Ni-Ti-PO₄ after a run time of 3 days (Runs 1 and 2) was considerably lower than coke deposition after 3 days on Ti-PO₄ (run 4) and Ni-Zr-PO₄ (run 5). Since hydrodemtallization catalysts deactivate more rapidly when coke is deposited, it is predicted that the catalyst life of invention catalysts A and B (Ni-Ti-PO₄) will greatly exceed that of control Catalyst C (Ti-PO₄) and control catalyst D (Ni-Zr-PO₄). It is believed that the higher coke deposit on Catalyst D after 3 days was responsible for its lower demetallization activity (removal of Ni+V) as compared with Catalysts A and B (after 3 days). Since Ni-Zr-PO₄ is more effective as a demetallization catalyst than Ni-PO₄ (as disclosed in U.S. Pat. No. 4,450,068), it is concluded that the catalyst composition of this invention (nickel titanium phosphate) is superior to titanium phosphate, nickel phosphate and nickel zirconium phosphate.

Reasonable variations and modifications are possible within the scope of the disclosure and the appended claims.

We claim:

1. A composition of matter, useful as a catalyst composition for hydrodemetallizing liquid hydrocarbon-containing feed streams, comprising a coprecipitate of nickel phosphate and titanium phosphate.

2. A composition of matter in accordance with claim 1 consisting essentially of coprecipitates of nickel(II) phosphate and titanium(IV) phosphate.

3. A composition of matter in accordance with claim 2, wherein said coprecipitate is a coprecipitate is a mixture of nickel(II) orthophosphate and titanium(IV) orthophosphate.

4. A composition of matter in accordanace with claim 1 having a weight ratio of (Ni+Ti) to phosphorus in the range of from about 1:1 to about 4:1 and an atomic ratio of Ni to Ti in the range of from about 1:5 to about 5:1.

5. A composition of matter in accordance with claim 1 having a weight ratio of (Ni+Ti) to phosphorus in the range of from about 1:1 to about 3:1 and an atomic ratio of Ni to Ti in the range of from about 1:2 to about 2:1.

6. A composition of matter in accordance with claim 1 having a surface area in the range of from about 5 to about 500 m²/g and a pore volume in the range of from about 0.2 to about 4.0 cc/g.

7. A composition of matter in accordance with claim 1 having a surface area in the range of from about 20 to about 250 m²/ and a pore volume in the range of from about 0.4 to about 2.0 cc/g.

8. A composition of matter in accordance with claim 1, wherein said composition of matter has been prepared by a process comprising the steps of:
(i) forming a coprecipitate of nickel(II) phosphate and titanium(IV) phosphate from an aqueous solution,
(ii) separating the coprecipitate formed in step (i) from said aqueous solution;
(iii) drying the separated coprecipitate obtained in step (ii);
(iv) calcining the dried coprecipitate obtained in step (iii).

9. A composition in accordance with claim 8, wherein said calcining is carried out in an oxidizing gas at a temperature in the range of from about 300° to about 800° C.

10. A composition in accordance with claim 9, wherein said calcining in an oxidizing gas is carried out at a temperature in the range of from about 400° to about 650° C.

11. A composition of matter, useful as a catalyst composition for hydrodemetallizing liquid hydrocarbon-containing feed streams, consisting essentially of a mixture of
(A) a coprecipitate of nickel phosphate and titanium phosphate, and
(B) at least one inorganic refractory material being present in the amount of 1 to about 90 weight-%, based on the total weight of said mixture.

12. A composition of matter in accordance with claim 11, wherein said at least one inorganic refractory material is selected from the group consisting of alumina, silica, metal silicates, aluminosilicates, titania, zirconia, magnesia, and mixtures thereof.

13. A composition of matter in accordance with claim 11, wherein said at least one inorganic refractory material is alumina.

14. A composition of matter in accordance with claim 11, wherein said amount of said at least one inorganic refractory material is about 1 to about 50 weight-%.

15. A composition of matter in accordance with claim 11, wherein said coprecipitate is a coprecipitate of nickel (II) phosphate and titanium(IV) phosphate.

16. A composition of matter in accordance with claim 11, wherein said coprecipitate is a coprecipitate of nickel(II) orthophosphate and titanium(IV) orthophosphate.

17. A composition of matter in accordance with claim 11, wherein said coprecipitate has a weight ratio of (Ni+Ti) to phosphorus in the range of from about 1:1 to about 4:1 and an atomic ratio of Ni to Ti in the range of from about 1:5 to about 5:1.

18. A composition of matter in accordance with claim 11, wherein said coprecipitate has a weight ratio of (Ni+Ti) to phosphorus in the range of from about 1:1 to about 3:1 and an atomic ratio of Ni to Ti in the range of from about 1:2 to about 2:1.

19. A composition of matter in accordance with claim 11, wherein said mixture has been prepared from an aqueous solution, in which said at least one inorganic refractory material has been dispersed.

20. A composition of matter, useful as a catalyst composition for hydrodemetallizing liquid hydrocarbon-containing feed streams, consisting essentially of a coprecipitate of
(a) nickel phosphate,
(b) titanium phosphate
(c) at least one metal phosphate selected from the group consisting of cobalt phosphate, iron phosphate, chromium phosphate, molybdenum phosphate, vanadium phosphate, copper phosphate and zirconium phosphate,
wherein the weight of component (c) is less than the combined weight of components (a) and (b).

21. A composition of matter in accordance with claim 20, wherein said coprecipitate is selected from the group consisting of nickel-titanium-cobalt phosphate, nickel-titanium-iron phosphate, nickel-titanium-chromium phosphate, nickel-titanium-molybdenum phosphate, nickel-titanium-vanadium phosphate, nickel-titanium-copper phosphate, nickel-titanium-zirconium phosphate, nickel-titanium-cobalt-zirconium phosphate, nickel-titanium-cobalt-iron phosphate and nickel-titanium-cobalt-vanadium phosphate.

22. A composition in accordance with claim 20 wherein the weight percentage of component (c) in said coprecipitate is in the range of from about 1 to about 30 weight-%.

23. A composition of matter in accordance with claim 20 wherein component (a) is nickel(II) phosphate and component (b) is titanium(IV) phosphate.

24. A composition of matter in accordance with claim 20, wherein component (a) is nickel(II) orthophosphate and component (b) is titanium(IV) orthophosphate.

25. A composition of matter in accordance with claim 20, wherein the atomic ratio of Ni to Ti is in the range of from about about 1:5 to about 5:1.

26. A composition of matter in accordance with claim 20 wherein the atomic ratio of Ni to Ti is in the range of from about 1:2 to about 2:1.

* * * * *

UNITED STATES PATENT AND TRADEMARK OFFICE
CERTIFICATE OF CORRECTION

PATENT NO. : 4,705,768

DATED : November 10, 1987

INVENTOR(S) : Coombs et al.

It is certified that error appears in the above-identified patent and that said Letters Patent is hereby corrected as shown below:

Claim 3, lines 2/3, delete "is a mixture".

Claim 4, line 1, delete "accordanace" and substitute ---accordance--- therefor.

Claim 7, line 3, delete "$m^2$/" and substitute ---$m^2/g$--- therefor.

Signed and Sealed this

Fourteenth Day of June, 1988

Attest:

DONALD J. QUIGG

Attesting Officer

Commissioner of Patents and Trademarks